UNITED STATES PATENT OFFICE.

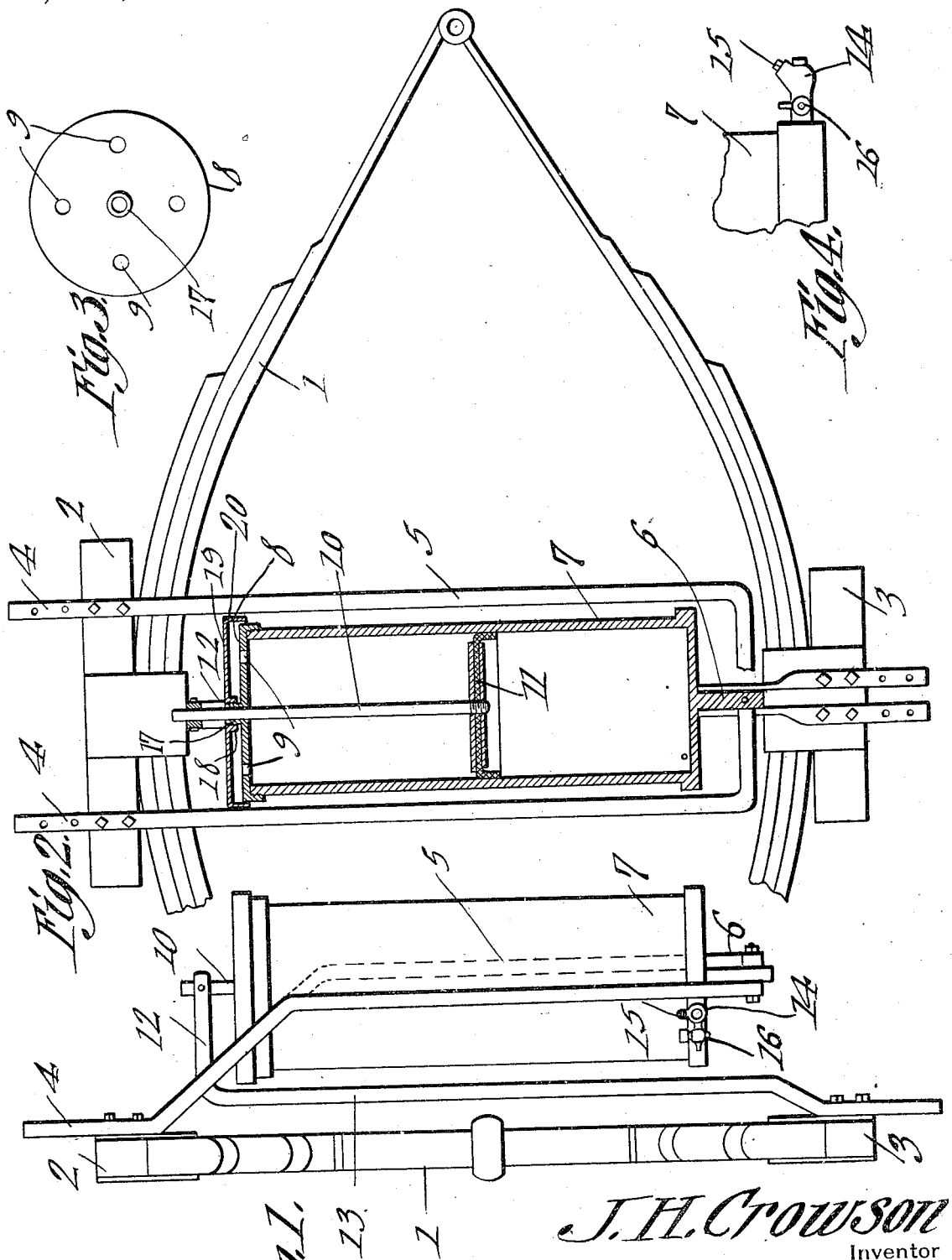

JONAS HENRY CROWSON, OF TEXARKANA, TEXAS.

SHOCK-ABSORBER.

1,179,506.  Specification of Letters Patent.  Patented Apr. 18, 1916.

Application filed April 27, 1915. Serial No. 24,277.

*To all whom it may concern:*

Be it known that I, JONAS H. CROWSON, a citizen of the United States, residing at Texarkana, in the county of Bowie and State of Texas, have invented a new and useful Shock-Absorber, of which the following is a specification.

This invention relates to shock absorbers for use in connection with vehicle springs whereby the sudden rebounding of the springs is prevented.

One of the objects of the invention is to provide a shock absorber which can be applied readily to the springs of a vehicle.

A further object is to provide a shock absorber which is simple in construction and will not readily get out of order and which will operate efficiently.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing the preferred form of the invention has been shown.

In said drawing: Figure 1 is an end view of a vehicle frame having the present improvement combined therewith. Fig. 2 is a side elevation of a portion of the spring, the cylinder and piston of the shock absorber being shown in section. Fig. 3 is a plan view of the cylinder. Fig. 4 is an elevation of a portion of the lower end of the cylinder and showing the arrangement of valves employed.

Referring to the figures by characters of reference 1 designates an elliptical spring of the usual shape employed in connection with vehicles and the shock absorber constituting the present invention is adapted to be secured to the middle portion of the upper and lower section of the spring. A block 2 is provided for attachment to the upper portion of the spring and another block 3 is provided for attachment to the lower portion thereof. To the block 2 are secured arms 4 which extend downwardly and outwardly and merge into a U-shaped hanger 5 formed of opposed members and to the lower or intermediate portion of which hanger is secured an ear 6 depending from the bottom of a cylinder 7 which is thus supported between the sides of the hanger. The upper end of the cylinder is closed by means of a removable head 8 having a small opening 9 and guided within this head is the rod 10 of a piston 11 adapted to work within the cylinder. The upper end of the piston rod is pivotally connected to a finger 12 extending laterally from the upper end of an arm 13 the lower portion of which is adjustably connected to the block 3. This arm 13 lies close to the cylinder 7 and between this cylinder and the spring, as shown particularly in Fig. 1. The finger 12 extends between the arms 4 and as it engages the upper portion of the piston rod 10, it will be seen that this finger 12 coöperates with the hanger 5 to hold cylinder 7 constantly in proper position relative to the spring.

Extending from the lower portion of the cylinder 7 is a tube 14 provided with a check valve 15 whereby air is free to enter the cylinder through the tube but is prevented from flowing outwardly by way of the inlet. A small cock 16 extends from the tube 14 between the check valve 15 and the cylinder 7 and constitutes a leak valve whereby air trapped within the cylinder 7 and below piston 11 is free to escape as fast as desired.

When the parts are connected to the spring 1 the piston 11 is normally positioned adjacent the center of the cylinder 7. When the spring contracts, the arms 13 remain stationary while the hanger 5 moves downwardly with the upper portion of the spring, thus lowering the cylinder 7 relative to the piston 11 and causing the air between the piston and the head 8 to be expelled through the small opening 9. When the upper and lower portions of the spring are moved apart the arm 13 holds the piston 11 stationary while the hanger 5 thrusts the cylinder 7 upwardly so that the air trapped between the piston 11 and the bottom of cylinder 7 will be slowly expelled through the cock 16, thus forming a cushion for retarding this movement. During the movement of the piston upwardly relative to the cylinder 7, air is drawn into the space below the piston by way of the tube 14, check valve 15 opening during this operation.

As a jolting of the vehicle will result in the rebound of the spring, it will be obvious that the first movement set up by the shock absorber will be the lowering of the cylinder 7 relative to the piston 11 and the drawing in of a charge of air through the tube 14. Thus during the rebound which immediately follows the contraction of the spring, this air drawn into the cylinder will constitute an efficient cushion for retarding the movement of the cylinder and piston 11 back to their normal positions relative to each other.

In order to prevent dust, mud and the like from entering the opening in the top of the cylinder, the cap or head 8 is preferably provided with an exteriorly threaded tubular stem 17 at its center which is detachably engaged by an interiorly threaded stem 18 depending from the center of a cap 19 having a flange 20 which projects close to the periphery of the head 8.

It is to be understood that any means other than those shown and described can be employed for attaching the shock absorber to a vehicle. Instead of attaching the upper and lower portions of the device to the upper and lower portions of a spring, they can be attached to the vehicle body and axle as will be obvious.

What is claimed is:—

1. The combination with a spring and a structure supported thereby, of a depending yoke fixedly connected to said structure, a cylinder supported by the yoke and beyond one side of the spring, a piston mounted for reciprocation within the cylinder, the rod of the piston being extended upwardly, a connection between said rod and the lower portion of the spring, there being an air vent in the upper end of the cylinder, and an imperforate cap extending over the upper end of the cylinder and having a depending flange surrounding but spaced from said end of the cylinder.

2. A shock absorber including yieldingly connected structures, a yoke fixedly connected to one of the structures and depending therefrom, a cylinder mounted on the yoke and supported between the sides thereof and beyond one side of the connection between the structures, said cylinder having an air vent in the upper end thereof, a cap secured upon the upper end portion of the cylinder and having a depending flange extending around but spaced from said end, said cap being imperforate, a piston mounted for reciprocation within the cylinder, a rod extending upwardly therefrom and through the upper end of the cylinder and the cap, and a rigid connection between the rod and the lower structure, said connection overhanging the upper end of the cylinder and extending along the wall thereof.

3. The combination with opposed structures, and a spring connection therebetween, of a yoke adjustably connected to the upper structure and depending therefrom, a cylinder carried by and between the sides of the yoke and beyond one side of the spring connection and between the structures, a piston mounted for reciprocation in the cylinder, a piston rod extending upwardly through the top of the cylinder, and a rigid connection between said rod and the lower structure, said connection being adjustably attached to the lower structure and being extended over and along the wall of the cylinder.

In testimony that I claim the foregoing as my own, I have hereto affixed my signature.

JONAS HENRY CROWSON.